United States Patent
Kamath et al.

(10) Patent No.: US 7,298,304 B2
(45) Date of Patent: Nov. 20, 2007

(54) INNOVATIVE METHOD OF CORRELATED DOUBLE SAMPLE (CDS) CIRCUIT TESTING

(75) Inventors: Ganesh Kamath, Bangalore (IN); Ravishankar S. Ayyagari, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 887 days.

(21) Appl. No.: 10/294,163

(22) Filed: Nov. 14, 2002

(65) Prior Publication Data

US 2004/0095123 A1    May 20, 2004

(51) Int. Cl.
*H03M 1/10* (2006.01)
(52) U.S. Cl. .................. 341/120; 341/118; 341/155
(58) Field of Classification Search .............. 341/120, 341/118, 155; 382/251; 348/349
See application file for complete search history.

(56) References Cited

U.S. PATENT DOCUMENTS

| | | | | |
|---|---|---|---|---|
| 5,406,329 A | * | 4/1995 | Kashimura et al. ......... | 348/175 |
| 5,937,100 A | * | 8/1999 | Kitajima .................... | 382/251 |
| 5,963,885 A | * | 10/1999 | Macq ......................... | 702/57 |
| 6,614,378 B2 | * | 9/2003 | Miyazaki et al. ........... | 341/155 |
| 6,657,668 B1 | * | 12/2003 | Hata ........................... | 348/349 |
| 6,903,670 B1 | * | 6/2005 | Lee et al. ................... | 341/118 |

* cited by examiner

*Primary Examiner*—Jean Bruner Jeanglaude
(74) *Attorney, Agent, or Firm*—Wade J. Brady, III; Frederick J. Telecky, Jr.

(57) ABSTRACT

The present invention comprises a test set-up (20) and method of testing a correlated double sampling circuit (CDS) (24) by using a sinusoidal test signal (22) for measuring linearity. The present invention generates a sinusoidal signal with two accurate and known levels at two different time points, as an input to the CDS. The cosinusoidal output of the CDS is then processed using an ADC (60) and processor (62) to check the functionality and linearity of the CDS circuit under test.

8 Claims, 3 Drawing Sheets

US 7,298,304 B2

INNOVATIVE METHOD OF CORRELATED DOUBLE SAMPLE (CDS) CIRCUIT TESTING

FIELD OF THE INVENTION

The present invention is generally related to testing CCD imaging systems, and more particularly to testing the linearity of a correlated double sampler (CDS) circuit used therein at a high resolution and high speed.

BACKGROUND OF THE INVENTION

Correlated double sampler (CDS) circuits are used extensively in CCD imaging systems for both scientific and commercial imaging systems. Testing a CDS circuit and characterizing it for linearity at high resolutions and speeds is a challenging task, touching the limits of existing technology. This is especially true with the introduction of 12-bit frontends for CCD imaging systems at speeds up to 21-MSPS for the commercial end equipment market. The task is complicated by the way a CDS is required to sample its input, the CCD waveform as shown at 10 in FIG. 1.

The CDS samples at two different points $t_1$ and $t_2$ separated at a fixed distance in time T at a given rate. Thus, in each cycle of the input waveform, the CDS is required to sample at two given points in time and give an output proportional to the difference in the voltage levels at these two points. These two points correspond to the reset level 12 of the signal and the video level 14 of the signal. The output in this case was given to an internal 14-bit ADC and the ADC digital output was checked for linearity using static tests.

Testing such a circuit for linearity requires an input voltage waveform with two accurate and known levels at two given time points at the given repetition frequency. Moreover, the voltage level of this waveform should be accurate to at least a couple of LSBs more than the resolution of the CDS, so that the overall performance is limited by the CDS rather than by the input source. In addition, this waveform requires the video level to be changing in a discrete ramp fashion from cycle to cycle so that what we see at the CDS output would be a ramp. This aids in conveniently figuring the CDS linearity, conventionally performed using a simple histogram technique.

But, this ramp "modulation" also presents the greatest challenge in generating such a waveform. Other methods may involve input sources other than the exact waveform previously described and indirect interpretation of the accrued results. Additional constraints imposed by the nature of the CDS input circuitry and requirements arising from the limitations of the CDS input circuit further complicate the test process.

Although it is possible to do away with such special waveform requirements by including a sample-and-hold type test circuit in the CDS, this disrupts the normal functioning of the CDS. This introduces additional unwanted parasitic elements in the signal path, which is not desirable for such a high-resolution system.

Schemes also exist where the test-mode input pins to the CDS are brought out separately through the required additional components. But these schemes are unsatisfactory in that they do not test the actual signal path on which the CDS operates. They also require additional pins on the package.

There is desired a methodology of testing the CDS linearity at high resolution and high speed while aiming for the minimum test cost. The testing method should be repeatable and worthy of production testing.

SUMMARY OF THE INVENTION

The present invention achieves technical advantages as a test set-up and innovative method of testing a correlated double sample (CDS) circuit by providing a sinusoidal signal to the CDS which in turn generates a cosinusoidal output processed by an ADC and a processor. Generating such a sinusoidal signal at high precision is far more convenient than a ramp or similar waveform as in prior art.

By providing a sinusoidal signal to the CDS under test, the CDS will generate a cosinusoidal signal. A conventional ADC is capable of processing such a cosinusoidal output signal, whereby a sinusoidal histogram is utilized to obtain predictable and measurable data. Specifically, the processor is able to ascertain the linearity of the CDS under test, and generate a plot of the CDS performance if desired. The processor calculates the expected error of the CDS as a function of a slope of the sinusoidal input provided to the CDS. Moreover, the processor provides a least square curve fit of error versus slope for each state of the CDS. The processor also models discontinuities in the error from state to state of the CDS.

DETAILED DESCRIPTION OF THE PREFERRED EMBODIMENT

Sine-Wave Histogram

Figure 1:
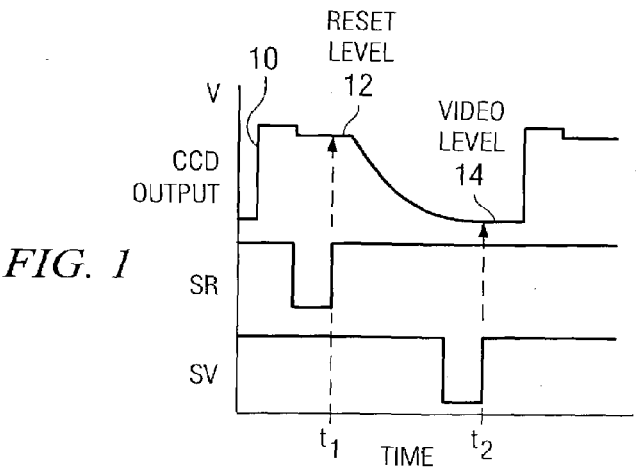
FIG. 1 is a waveform diagram of a conventional CCD signal and the associated sample reset and sample video signal.
Figure 2:
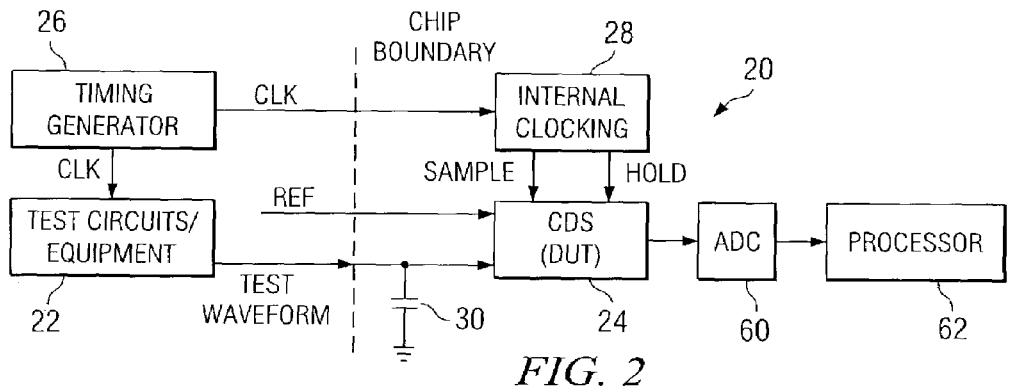
FIG. 2 is a block diagram of a CDS system and test setup according to the preferred embodiment of the present invention including the test circuit generating a sinusoidal signal, and the CDS being analyzed by an ADC and a processor.

A sine wave can replace the more common ramp waveform in testing ADC linearity. However, the output data histogram must be interpreted differently for such a scheme to work. The present invention provides various algorithms for doing this and takes advantage of this fact in testing the CDS followed by an ADC 60, as shown in FIG. 2.

Consider the action of the CDS 24. The present invention recognizes that by sampling at two different time points in a repeated fashion, the CDS is in effect differentiating the input signal. For a sinusoidal signal applied by test equipment 22 at a frequency fs at the input of such the CDS 24, the output is:

$$Vo(nt_1) = Vi\,\sin(nt_1) - Vi\,\sin(nt_1 + t_2)$$

Where n=0,1,2 . . .
  $t_1$=1/fs and
  $t_2$=Tsv−Tsr, the time difference between the reset and video points.

As both $t_1 \geq 0$ and $t_2 \geq 0$, the present invention recognizes that the above equation represents differentiation of the input sinusoidal signal, yielding a cosinusoidal signal. It is noted that the amplitude of this cos signal is proportional to the slope or frequency of the input sinusoidal signal. Thus provided, the CDS sampling rate is much larger than the input sinusoidal signal. Advantageously, the present invention obtains a predictable and measurable cosinusoidal signal at the output of the CDS using the previously mentioned sinusoidal histogram methods to obtain the linearity plots for this data, representing the CDS performance.

The low frequency sinusoidal signal at 14-bit precision to test the CDS may be conveniently generated through using precision audio frequency waveform generators. The output data from ADC 60 is processed by processor 62, such as a DSP, to incorporate sine wave histogram methods to predict the linearity. Previous methods considered included schemes where an FFT spectrum is obtained from the sample sets acquired from the converter's output and the harmonic components in this spectrum were considered to be the channel error. The modified technique is used by processor 62 in the present invention wherein the expected error for each state of the converter is calculated as a function of the slope of the input. This technique provides estimates of expected error, which in turn provide least square curve fits of error versus slope for each state. With this technique, discontinuities in error are accurately modeled from state-to-state, thus providing improved error representation.

The expected error for a given state of the ADC 60 is described by the equation:

$$E_i = i - G\left(\frac{t_i + t_{i+1}}{2}\right) - x_o \quad i = 1, 2, \ldots, 2^n - 2$$

In the case of the sinusoidal input, estimated thresholds are obtained from the equation:

$$t_1 = -A\cos\left(\pi\frac{Si - 1}{N}\right) + c, \quad i = 1, 2, \ldots, 2^n - 1$$

Thus, the estimated expected error of a particular ADC code is obtained by combining the above two equations to give the equation:

$$E_i = i + GA\left(\frac{\cos\left(\pi\frac{S_i - 1}{2}\right)}{N} + \cos\left(\frac{S_i}{\pi}\right)}{2}\right) - G(c - x_o)$$

where G and $x_o$ are the gain and the offset and N is the number of samples in a set.

Figure 3:
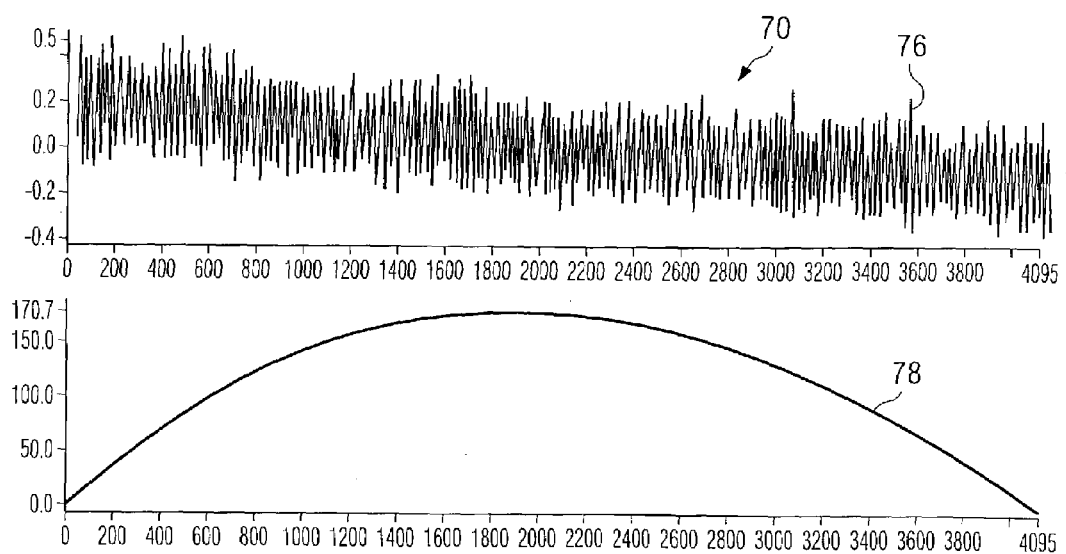
FIG. 3 and FIG. 4 show DNL and INL, for a ramp waveform with a conventional histogram calculation (FIG. 3) and a sine waveform (FIG. 4) with a sinewave histogram calculation, with a fixed distortion introduced deliberately.
Figure 4:
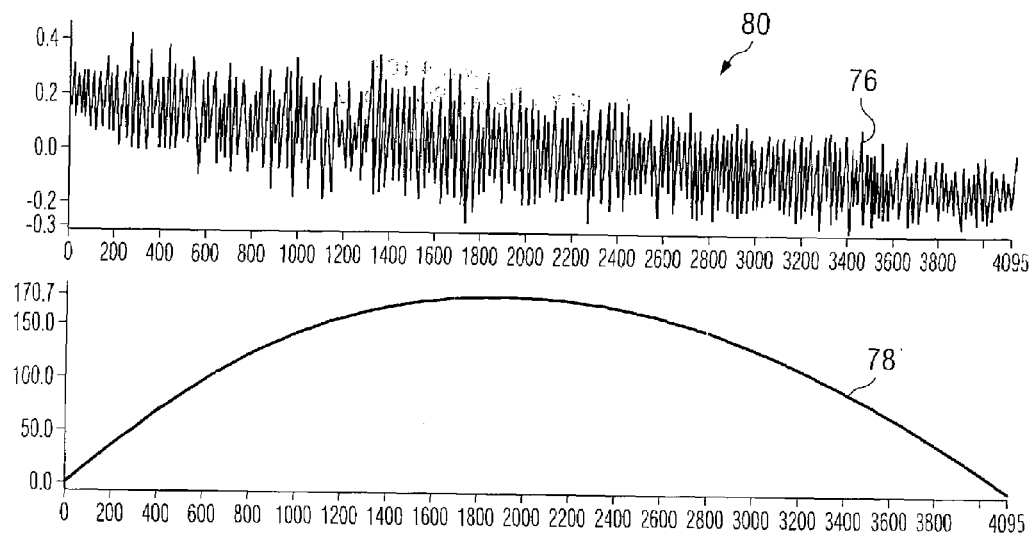
Figure 5:
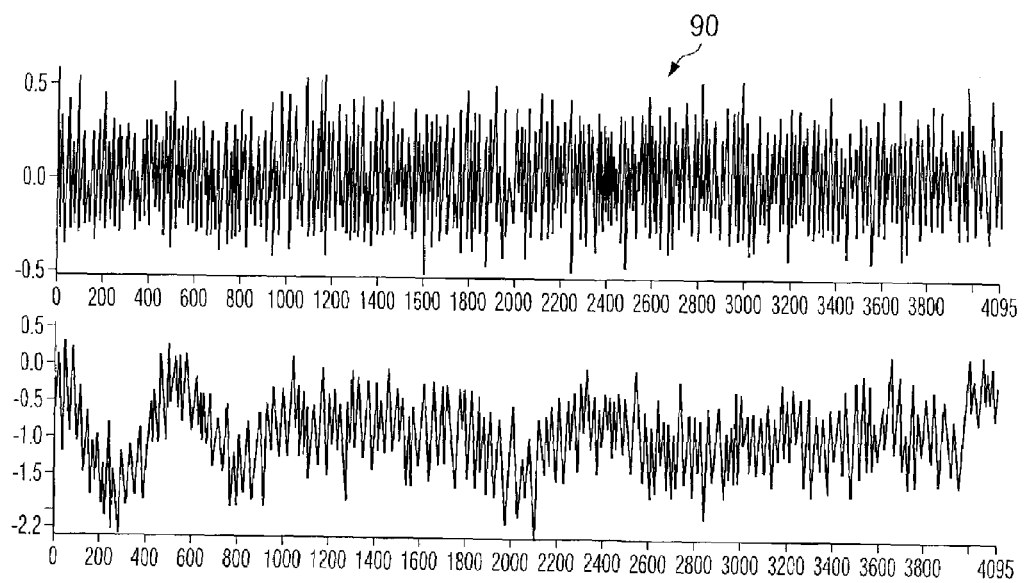
FIG. 5 shows a results screen for the sine-based testing of the CDS at 7.5-MSPS sampling rate and 200-kHz input sine frequency according to the present invention.
Figure 6:
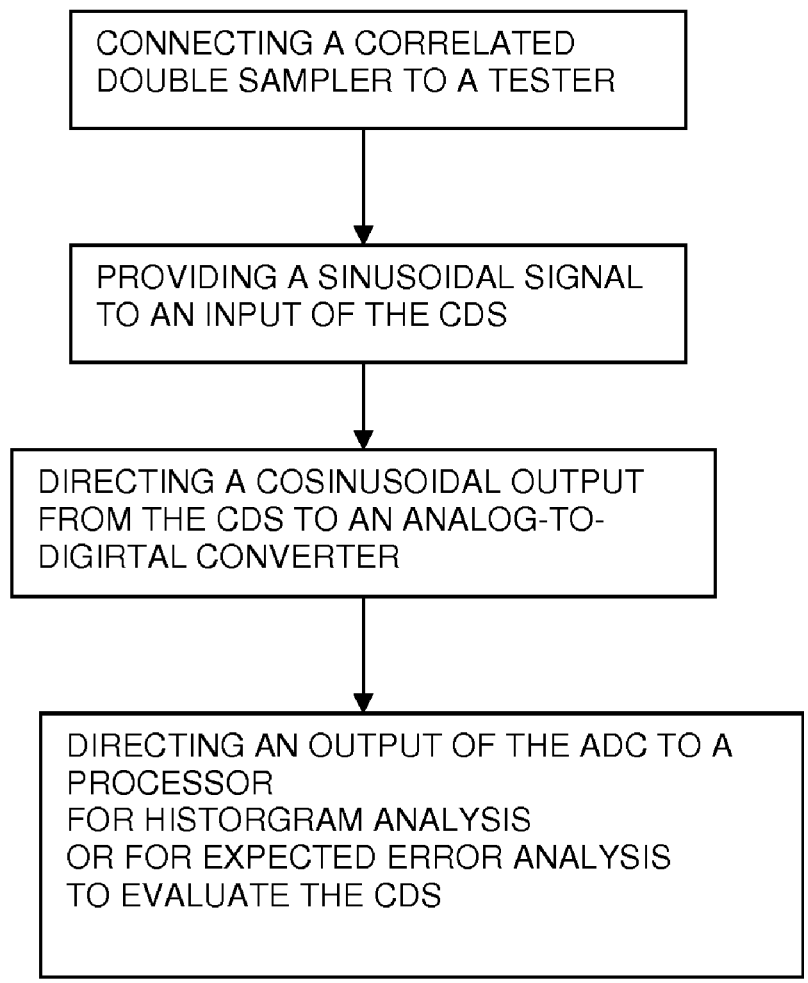
FIG. 6 is a flowchart indicating an embodiment of a method implementing the principles of the invention.

The screens in FIGS. 3 and 4 show the DNL 76 and INL 78, in that order, for a ramp waveform in FIG. 3 with a conventional histogram calculation and a sine waveform in FIG. 4 according to the present algorithm, with a fixed distortion introduced deliberately. The sinusoidal based method matches the ramp results to an adequate accuracy. FIG. 5 shows at 90 the results screen for the sine-based testing of the CDS 24 at a 7.5-MSPS sampling rate and 200-kHz input sine frequency. This shows an INL of around 2.5 LSB for the entire channel. This method utilized in testing and bench-characterization of the CDS inside an analog front end (AFE) of a digital still camera provides excellent results.

In summary, the present invention achieves technical advantages by using a sinusoidal wave with appropriate algorithms for sine wave binning to provide an accurate answer to the problem of CDS test and characterization at resolutions exceeding 12-bit and speeds exceeding 15 MSPS.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A test set-up, comprising:
   a CDS having an input and an output;
   a signal source for providing a sinusoidal waveform to the CDS;
   an ADC for receiving an output from the CDS being a function of the processed sinusoidal waveform and generating a test output signal; and
   a processor for receiving and analyzing the test output signal from the ADC,
   wherein the CDS generates a cosinusoidal signal in response to the sinusoidal waveform provided thereto,
   wherein the processor determines linearity of the CDS as a function of the processed cosinusoidal signal, and
   wherein the processor calculates expected error of the CDS as a function of a slope of the sinusoidal input provided to the CDS.

2. The test set-up as specified in claim 1 wherein the processor provides a least square curve fit of error versus slope for each state of the CDS.

3. The test set-up as specified in claim 2 wherein the processor models discontinuities in error from state to state of the CDS.

4. The test set-up as specified in claim 3 wherein the estimated error of the ADC processing the cosinusoidal test signal is defined by the equation:

$$E_i = i + GA\left(\frac{\cos\left(\pi\frac{S_i - 1}{2}\right)}{N} + \cos\left(\frac{S_i}{\pi}\right)}{2}\right) - G(c - x_o)$$

were G and $x_o$ are the gain and the offset and N is the number of samples in a set.

5. A method of testing a CDS, comprising the steps of:
   providing a sinusoidal signal to an input of the CDS;
   utilizing an ADC to process the cosinusoidal output signal;
   providing a processor for receiving and analyzing a test output signal from the ADC; and
   analyzing a cosinusoidal output signal generated by the CDS in response to the sinusoidal input;
   wherein the processor determines linearity of the CDS as a function of the processed cosinusoidal signal, and
   wherein the processor calculates expected error of the CDS as a function of a slope of the sinusoidal input provided to the CDS.

6. The method as specified in claim 5 wherein the processor provides a least square curve fit of error versus slope for each state of the CDS.

7. The method as specified in claim 6 wherein the processor models discontinuities in error from state to state of the CDS.

8. The method as specified in claim 7 wherein the estimated error of the ADC processing the cosinusoidal test signal is defined by the equation:

$$E_i = i + GA\left(\frac{\cos\left(\pi\frac{S_i - 1}{2}\right)}{N} + \cos\left(\frac{S_i}{\pi}\right)}{2}\right) - G(c - x_o)$$

were G and $x_o$ are the gain and the offset and N is the number of samples in a set.

* * * * *